United States Patent [19]

Darmon

[11] Patent Number: 4,721,006

[45] Date of Patent: Jan. 26, 1988

[54] MECHANISM FOR CIRCULAR GUIDING

[76] Inventor: Michel Darmon, 68 boulevard Pasteur, 75015 Paris, France

[21] Appl. No.: 722,983

[22] Filed: Apr. 15, 1985

[30] Foreign Application Priority Data

Apr. 13, 1984 [FR] France ................................ 84 05901

[51] Int. Cl.$^4$ .......................... G05G 1/04; E05F 11/44
[52] U.S. Cl. ......................................... 74/519; 49/351
[58] Field of Search .......................... 74/520, 521, 519;
173/38; 248/277, 280.1, 281.1, 421; 49/40, 350, 351

[56] References Cited

U.S. PATENT DOCUMENTS

| | | | |
|---|---|---|---|
| 2,156,148 | 4/1939 | De Giacomo et al. | 248/421 |
| 2,272,230 | 2/1942 | Van Voorhees | 16/306 |
| 2,549,562 | 4/1951 | Baker . | |
| 2,551,130 | 5/1951 | Hunt et al. . | |
| 3,195,656 | 7/1965 | Johnson et al. . | |
| 3,312,980 | 4/1967 | Erbach . | |
| 3,426,994 | 2/1969 | Daniel, Jr. . | |
| 3,484,004 | 12/1969 | Hughey . | |
| 3,501,120 | 3/1970 | Daniel, Jr. . | |
| 3,703,968 | 11/1972 | Uhrich et al. . | |
| 4,059,141 | 11/1977 | Hutton . | |
| 4,249,427 | 2/1981 | Colinet et al. . | |

FOREIGN PATENT DOCUMENTS

| | | |
|---|---|---|
| 0021171 | 1/1981 | European Pat. Off. . |
| 2348354 | 11/1977 | France . |
| 2055754 | 3/1981 | United Kingdom . |

OTHER PUBLICATIONS

"Three Dimensional Drives" by Capellen, *Mechanisms, Linkages & Mechanical Controls*, pp. 46–51, McGraw-Hill Book Company, Copyright 1965.

"Motion Geometry of Mechanisms"; E. A. Dijksman; Cambridge University Press, pp. 102–123 and 158–160.

"Tragheitswirkungen an verschiedenen Ausfuhrungsformen des Hookeschen Schlussels", *Feinwerktechnik*, vol. 65, No. 10, Oct. 1961, W. Rath, pp. 359–363.

"Type and Mobility Analysis of the Spherical Four-Link Mechanism" C87/72; M. J. Gilmartin et al., *Mecanism 72, Institution of Mechanical Engineers*, pp. 90–97.

"Gertriebebeispiel Atlas" K. Hain, VDI Verlag, paragraphs 3.1.1, 3.1.5, 4.1.1, 10.1.2., 10.1.5, 10.1.6, 10.2.3, 10.2.4, 10.3.1.

"Mechanisms, Linkages, and Mechanical Controls"; Nicholas Chironis, McGraw-Hill Book Company, New York, San Francisco, Toronto, London and Sydney; pp. 72–77.

"Straight-Line Linkages", Machine Design, vol. 22, Jan. 1950; H. G. Conway; pp. 90–92.

"Koppelkurvenatlas als Mittel zur Konstruktionsvereinfachung"; *VDI-Berichte*, vol. 29; 1958, J. Volmer; pp. 103–108.

"On a Class of Spherical Linkages"; *Abstracts of Papers Presented at ASME Meetings*, vol. 90, No. 11; Nov. 1968, F. Y. Chen; p. 68.

"Geometrical Considerations on Space Kinematics in Connection with Bennett's Mechanism"; B. Groeneveld; La Haye (NL).

Primary Examiner—Lawrence J. Staab
Attorney, Agent, or Firm—Young & Thompson

[57] ABSTRACT

The mechanism comprises a movable member having three axes converging in a center of the mechanism, i.e. two main axes guided each by a crank, and a driven axis on which any point follows a substantially circular path centered in the above center. This is due to an appropriate geometry. A driven member may be linked to the movable part about the driven axis, and to a parallelism rod which is in turn linked to one of the cranks. The driven member remains then parallel to itself when the mechanism is actuated, that is, when the one crank is rotated with respect to a carrier member. The driven member may be a cylindrical side window of a car.

3 Claims, 12 Drawing Figures

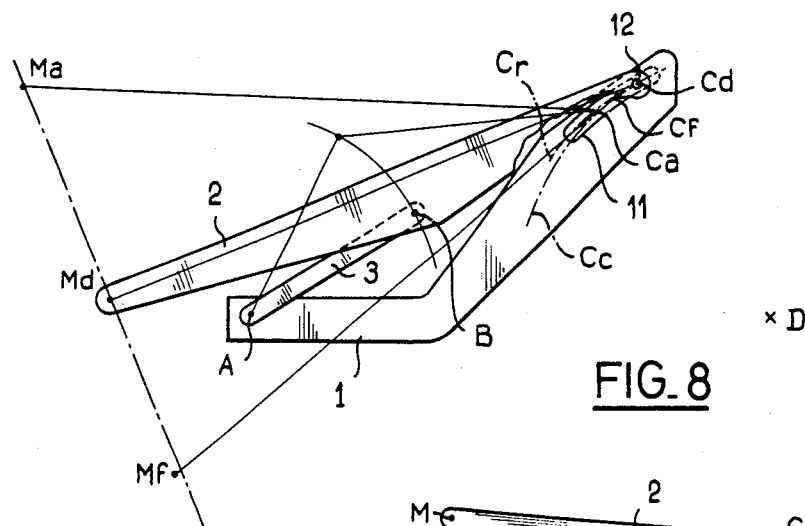
FIG_8
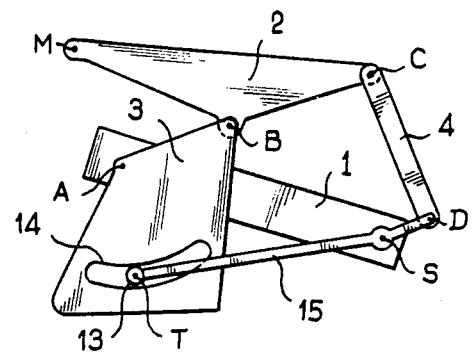
FIG_9
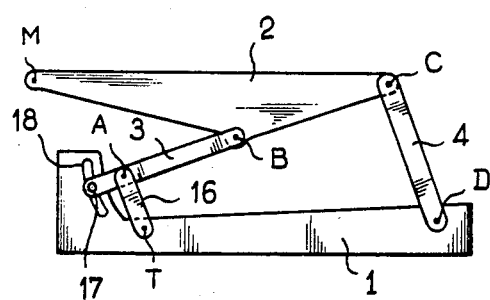
FIG_10
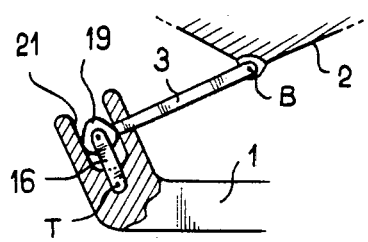
FIG_11
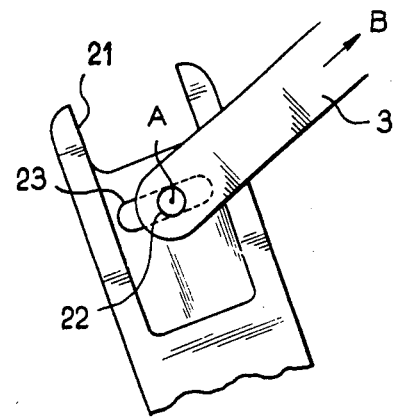
FIG_12

MECHANISM FOR CIRCULAR GUIDING

This invention relates to a mechanism for guiding at least one point substantially along a segment of a circle even if the centre of that circle is inaccessible or accessible only with difficulty.

It is known to provide such guidance by means of slides but this is an expensive and relatively unsatisfactory solution, for guidance is poor if there is a short supported length, jamming may occur, the precision engineered surfaces are exposed to impact, the deposition of abrasive dust and corrosion, there is considerable friction, backlash which is very difficult and expensive to eliminate, and it is a complex matter to transmit movement through a sealed wall.

The object of the invention, therefore, is to provide a guide system which obviates the said disadvantages and which is based on general features enabling numerous requirements of curved trajectories to be satisfied.

The invention therefore relates to a guide mechanism comprising a carrier member, a movable member to which a driven point is geometrically linked for the purpose of guiding the driven point with respect to the carrier member along a useful trajectory substantially in the form of a segment of a circle whose centre is at a finite distance, and means for guiding the movable member so that a first main axis and a second main axis geometrically fixed with respect to the movable member follow, with respect to the carrier member, a first cone of substantially circular base and a second cone respectively, both having as apex the said centre.

According to the invention, the mechanism is characterised in that in a reference position a main plane bearing the main axes also bears the axis of the first cone, and, together with the plane normal to the second cone and passing through the second main axis, forms an angle U oriented from the main plane towards the normal plane and substantially being between 60° and 120°, and in that the angle (x) between a driven axis joining the centre to the driven point and the second main axis substantially verifies the equation (1):

$$\sin 2x = \frac{2 \sin h}{\sin r} [\sin (h + r)] \frac{\sin (U - V)}{\sin U}$$

where:
 r denotes the angle at the apex of the first cone;
 h denotes the angle between the two main axes;
 r and h being algebraic terms considered as having the same sign if, in the reference position, the first main axis is between the axis of the first cone and the second main axis, and of opposite sign in the opposite case; and
 V denotes the angle between the main plane and a plane passing through the second main axis and through the driven point, said angle being oriented from the main plane towards the plane passing through the second main axis and through the driven point, U and V being measured with the same sign rule.

The mechanism thus defined may, inter alia, be made in the form of a quadrilateral articulated at its apices along four axes which converge all together at the centre of the useful trajectory of the driven point.

The four sides of the quadrilateral are formed by the carrier member, the movable member, and two cranks each articulated to the movable member at one of the main axes respectively and to the carrier member along the axis of the cone bearing the trajectory of said main axis.

By construction, all the points connected to the movable member follow, with respect to the carrier member, trajectories borne by spheres having the said centre. The invention defines in combination, on the one hand, a range of configurations of the mechanism and, on the other hand, in a mechanism having one of these configurations arbitrarily, a driven axis passing through the centre and any point of which has a trajectory portion very much approaching an arc of a circle having the said centre.

It is thus possible to associate a driven member with the movable member in such a manner that one of the points of the driven member follows a circular trajectory, this being possible without having access to the centre of the circle and without the use of slides having a corresponding length. The association between the movable member and the driven member is such that the said point of the driven member is on the driven axis connected to the movable member. The driven axis is not necessarily embodied. It is fundamentally only a geometric detail of the system. The driven point may, for example, be the point of the indicator needle of a measuring device. The needle is then fixed to the movable member so that the point is on the driven axis but the driven axis does not necessarily correspond to a mechanical or geometric axis of the device. However, by mounting, for example by fixing the driven member on the movable member so that one of the axis of the driven member permanently coincides with the driven axis, an additional result obtained is that the said axis of the driven member constantly sights the centre of the mechanism or the opposite direction thereto. The movable member can thus carry a rotary tool, e.g. a drill, the axis of which coincides with the driven axis, in order to carry out drilling operations in different angular positions on a component having, for example, a concave or convex cylindrical surface whose axis passes through the centre of the guide mechanism. The movable member may also carry a transmitter or emitter device, a receiver, or any type of pickup, required to be adjusted within a certain angular range about an axis which is difficulty accessible.

Other features and advantages of the invention will be apparent from the following description with reference to the accompanying drawings, which are given by way of non limitative examples and wherein:

FIGS. 8 to 12 are details of various variants of the mechanism shown in FIG. 1.

Figure 1:
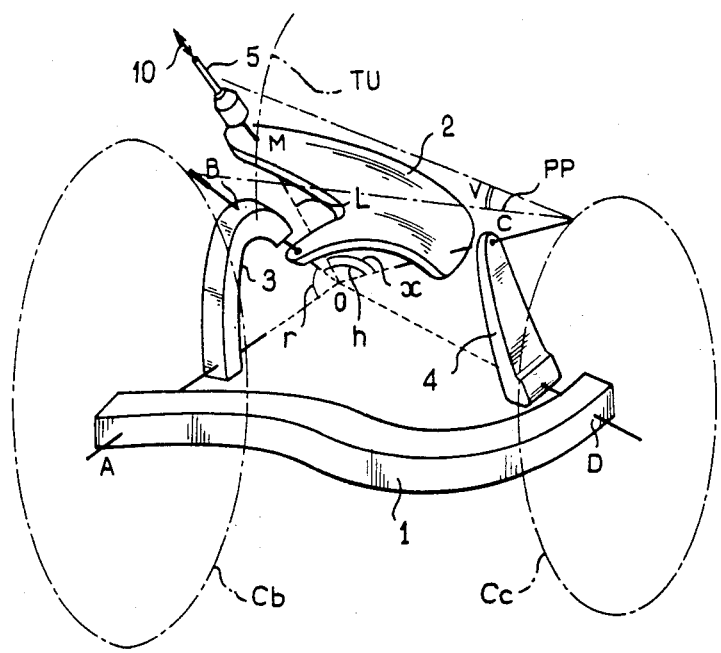
FIG. 1 is a diagrammatic perspective of a mechanism according to the invention providing guidance of a driven point along a trajectory in the form of a segment of a circle.

In the example illustrated in FIG. 1, in which the parts have voluntary been given an arbitrary shape in order to show only the geometric features which have a function in the guidance according to the invention, the mechanism comprises a rigid carrier member 1, a rigid movable member 2 bearing a driven point M carried by a driven axis L passing through a centre O. The distance between the driven point M and the centre O is finite.

The mechanism also comprises means whereby a first main axis B and a second main axis C connected to the movable member 2 respectively describe a first cone Cb and a second cone Cc, both of circular base, with respect to the carrier member 1. The cones Cb and Cc have as the common apex the centre O, but their axes A and D respectively rigidly connected to the carrier member 1 are separate.

In the example illustrated, the said means comprise a crank 3 articulated to the carrier member 1 along the axis A and to the movable member 2 along the axis B, and a crank 4 articulated to the carrier member 1 along the axis D and to the movable member 2 along the axis C.

Figure 2:
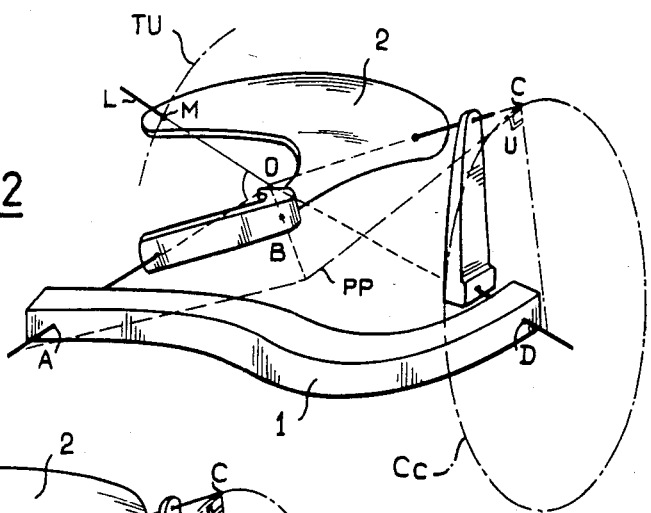
FIG. 2 is a perspective of the mechanism of FIG. 1 in the reference position.

As will be seen in FIG. 2, the angles between the axes A and B, B and C, C and D, and A and D are so selected that in a reference position in which a main plane PP bearing the main axes B and C also passes through the axis A, the said main plane PP together with the plane passing through the axes C and D forms an angle U oriented from the plane PP towards the plane passing through the axes C and D, the angle U being between 60° and 120°, and more particularly exactly 90° in the example illustrated.

Also, the angle x between the axis L and the second main axis C verifies the equation (1):

$$\sin 2x = \frac{2 \sin h}{\sin r} [\sin (h + r)] \frac{\sin (U - V)}{\sin U}$$

where, with reference to FIGS. 1 and 2 in which the angles between straight lines are shown by a single line and the angles between planes by a double line:

r denotes the angle at the apex of the cone Cb;

h denotes the angle between the two main axes B and C;

V denotes the angle between the main plane PP and a plane passing through the axis C and the axis L, the angle V being oriented from the plane PP towards the plane passing through the axes C and L, and measured with the same sign rule as U, r and h are algebraic terms which are of the same sign in the example illustrated, in which the axis B is between the axes A and C in the reference position, and would be of opposite sign in the opposite case.

x, on the other hand, has no sign because the oriented angle V already defines the half-line on which the point M is situated with respect to the main plane and to the axis C.

Under these conditions, when the mechanism moves near its reference position, the point M describes a useful trajectory TU very close to a segment of the circle centred on the centre O. The error in the trajectory TU with respect to a perfect circle is in theory an infinitesimally small one with respect to the length of the trajectory. The invention thus provides a mechanical means whereby a point can be made to describe a segment of a circle, subject to a tolerance compatible with precision engineering, without the use of any means for guidance originating from the center of the circle or a coaxial circular slide.

Also, if the movable member 2 carries a driven device so mounted that the axis of said device coincides with the driven axis L, then the axis of the device will certainly always pass through the centre O. Thus it is for example possible to fix along the axis L a drilling machine of which the drill 5 (only illustrated) is movable in rotation about its axis L. The drilling machine is movable in translation along the axis L to carry out the machining feed (see double arrow 10). It is thus possible to carry out drilling operations with different angular orientations in a cylindrical surface whose axis coincides with the axis of the circle of which T.U. is a segment. The special features of the mechanism enable the drilling operations to be distributed over the same segment of a circle and to regulate their depth by means of the feed with respect to the part 2.

A device of this kind 1, 2, 3, 4 is also applicable, for example, in tomography, X-ray diffraction and, more generally, techniques in which devices or parts are required to describe a circle while sighting its centre or the opposite direction to its centre. In that case, all that is required is to secure the device or the part in question to the movable member 2 so that the line of sight of the device or part coincides with the driven axis L.

Figure 3:
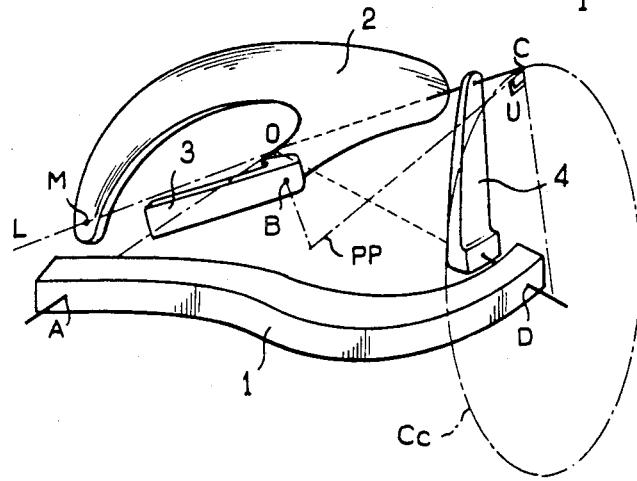
FIG. 3 is a perspective of an alternative embodiment of the mechanism shown in FIG. 1.

The accuracy of the useful trajectory of the driven point M is improved if, as shown in FIG. 3, angle V is zero and angle U is very close to 90° or equal, so that the straight line L is in the main plane PP.

The results are even better when the following equation is also verified in this case:

$$2 \sin^2 r \sin^2 x - \sin h [\sin h - \sin r \cos(h+r)] = 0$$

Figure 4:
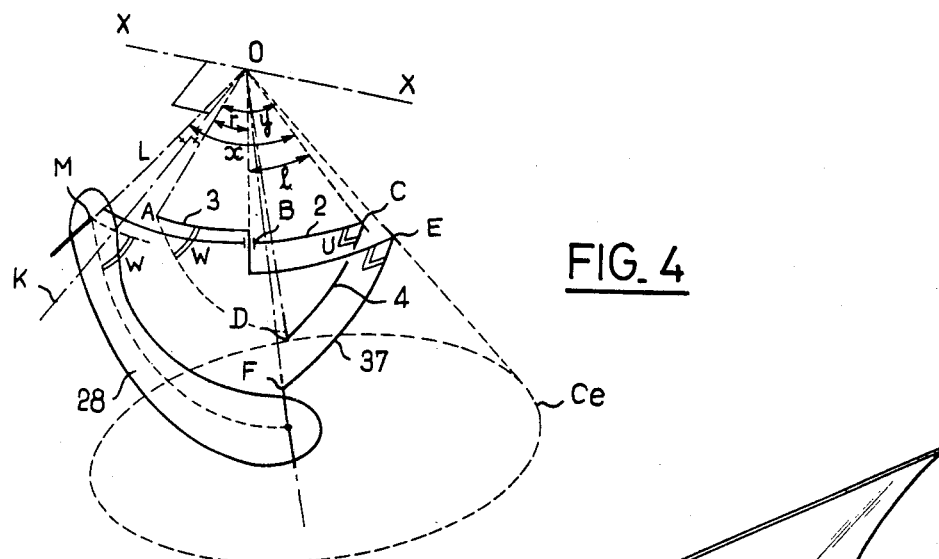
FIG. 4 is a diagrammatic perspective of a variant of the mechanism shown in FIG. 1.

In the example of FIG. 4, all the articulation axes are concurrent at the centre O. The movable member 2 will be apparent, which is guided directly in its main axes B and C by cranks 3 and 4 articulated by their respective axes A and D to the carrier member which, for the sake of clarity, is not illustrated.

Also, crank 3 is continued as far as an axis E by which it is articulated to a parallelism link 37 articulated along an axis F to a driven member 28. Thus the link 37 guides the axis E along a third cone Ce of axis F stationary with respect to the driven member 28.

The system satisfies equation (1) and also the following conditions:

Axis E is in the plane bearing the axes A and B.

Axis E together with axis A forms an angle Y which is one or other of the roots of the following equation:

$$\sin 2y = \frac{2 \sin (y - r)}{\sin (x - h)} \sin (x + y - h - r)$$

In the reference position (shown in FIG. 4, the plane bearing the axes E and F forms with the plane bearing the axes E and B an angle equal to the angle U (substantially equal to $\pi/2$).

Thus when the mechanism moves near its reference position, the driven member 28 receives a movement very close to a rotation about an axis XX perpendicular to a bisector plane between the axes A and L. The line K of the said bisector plane is shown in the plane of the axes A and L in FIG. 4.

This movement is embodied even more exactly if the axis F is so positioned that in the reference position the angle W between the plane passing through the driven point M and through the axis C and the plane passing through the driven point M and the axis F is substantially equal to the angle between the plane passing through the axes A and D and the plane passing through the axes A and C.

In a specific embodiment, the mechanism is thus such that in the reference position the axes A and L, C and E, D and F are respectively coincident. The axis XX is then perpendicular to the axes A and L.

Figure 5:
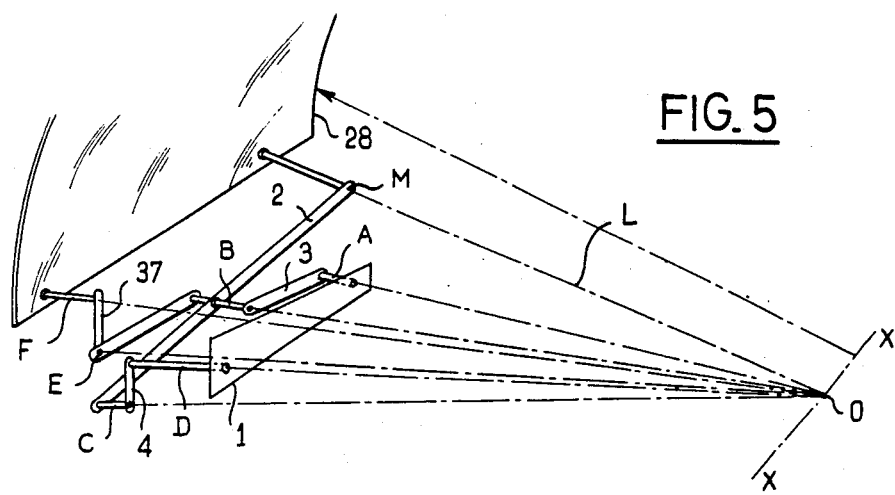
FIGS. 5 to 7 are diagrammatic perspectives of cylindrical window operating mechanisms for a motor vehicle in accordance with the invention.

In the example shown in FIG. 5, the mechanism of FIG. 4 is applied to the drive for a cylindrically curved descending side window of a motor vehicle, the window constituting the driven member 28. The mechanism has been shown with an exaggerated thickness in order to be more readily intelligible. The different parts will be apparent from their references. The centre O is carried by the axis XX of curvature of the window 28 and it is so positioned that the plane passing through the centre O and perpendicularly cutting the window 28 is a bisector plane of the axis A and of the line L when the mechanism is in the reference position. Also, in the reference position, the main plane (passing through the axes B and C) is perpendicular to the plane of the required trajectory for the point M, i.e. a segment of a circle centred on the axis XX and carried by the window 28. The rods which embody the axes F and M are rigidly secured to the window 28.

By rotating the crank 3 by hand or by means of a motor, window 28 is moved while still being carried by a stationary virtual cylinder. This system has the advantage of doing away with the need to guide the window by means of lateral slides which may, however, still be provided for sealing reasons, but no longer act as guides as such, nor do they give any risk of causing obstructive friction or jamming.

Figure 6:
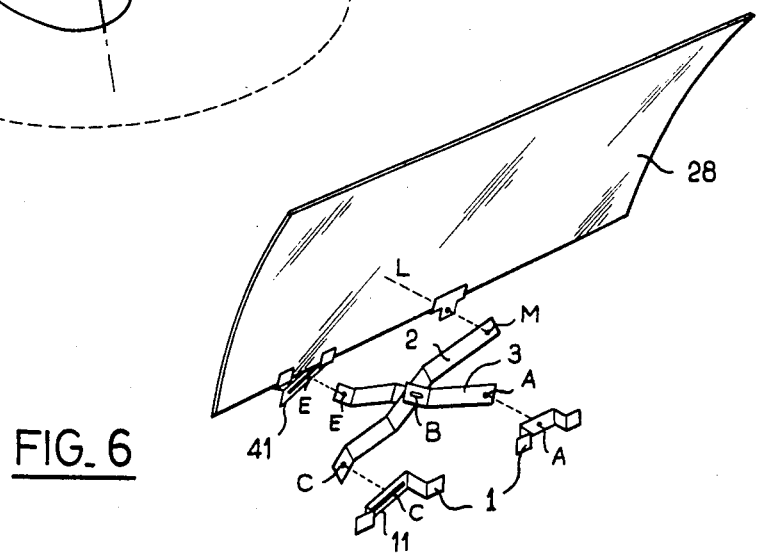

In the example shown in FIG. 6, the mechanism of FIG. 5 is simplified in that for the purpose of guiding the axis C the crank 4 is replaced by a slide 11 in which the axis C is engaged and which is adapted to be fixed to the carrier member 1 by means of a frame (not shown).

Also, the link 37, which formed a means of guiding the axis E along a conical trajectory of axis F and of apex O with respect to the window 28, is replaced by a slide fixed to the window 28 and in which axis E is engaged for guidance therein in approximately or exactly the same way as that provided by the link 37 in FIG. 4.

Since these slides are very short, they are easy to manufacture and inexpensive. It is possible so to shape them that they provide the same guidance as the links 4 and 37 that they replace. It is also possible to make them even cheaper by making them rectilinear, and in view of their short length this gives a good approximation to the trajectories which would be provided by the links 4 and 37 respectively. It is also possible to give at least one of them a profile so designed as to improve the quality of the trajectory of the window 28 still more with respect to the ideal cylinder.

In the example shown in FIGS. 5 and 6, each point of the window 28 moves over a circle borne by the cylinder to which the window is curved, and centred on the axis XX of this cylinder.

This is not suitable for all applications, because in some motor vehicles the window must move obliquely, e.g. to follow an oblique pillar. In other words, each point of the window has to follow a helix of the cylinder to which the window is curved.

Figure 7:
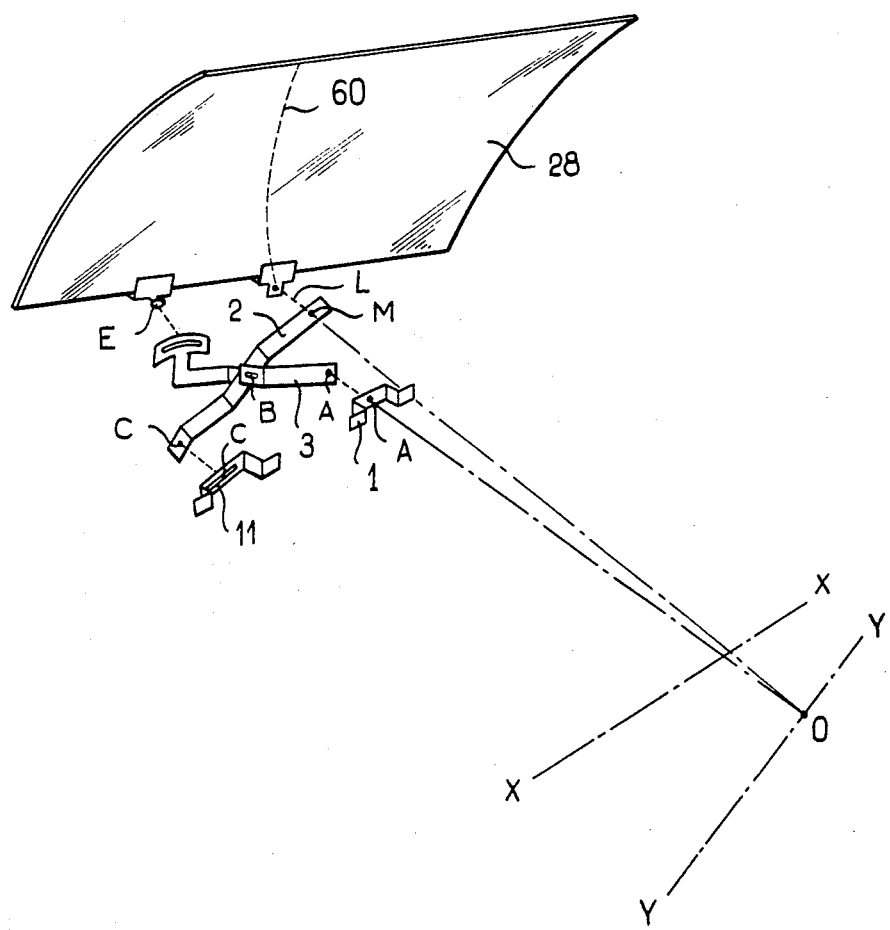

The example of FIG. 7, which will be described only in respect of the differences from FIG. 6, provides this function. The helical trajectory 60 of the driven point M is shown in broken lines on the window 28. The invention is then based on the consideration that the trajectory 60 differs very little from a segment of a circle that would be borne by a cylinder having an oblique axis with respect to the axis of curvature of the window, and a radius greater than the radius of curvature of the window. The mechanism in FIG. 7 is then organized as the one in FIG. 6, but with the centre O situated on the axis YY of the trajectory 60 as approximated by a circle, and no longer on the axis XX of curvature of the window 28.

Moreover, in the reference position, the parallelism axis E is positioned outside the main plane PP so that the plane passing through the axes L, E, be shifted angularly in the same angular direction as that from axis YY towards axis XX.

As a variant in comparison with the example shown in FIG. 6, the slide guiding the axis E is carried by the crank 3 and the stud engaging in that guide is fixed to the window 28.

FIG. 7 again shows the special feature according to which, in the reference position, the main plane (passing through the axes B and C) is perpendicular to the plane of the trajectory 60, which is considered circular.

As will already have been apparent, more particularly by reference to FIGS. 6 and 7, mechanisms according to the invention are characterized in that the second main axis C performs a relatively short travel compared to that of the driven point M and hence it is possible to replace the crank 4 for guiding the axis C by a profiled guide or slide 11 borne by the carrier member 1 and guiding a cylindrical stud 12 of axis C secured to the movable member 2. This is shown in FIG. 8, in the case of the most general embodiment of the mechanism guiding just an axis M. Also, to facilitate understanding of FIG. 8, and also of FIGS. 9 and 12 which will be described hereinafter, the mechanisms are shown as if they were plane, i.e. with their centre projected to infinity, although this is not the case in reality.

In the example shown in FIG. 8, the slide 11 may have a profile carried by the circular-base cone Cc in FIG. 1 or FIG. 3. In a simplified embodiment, the guide 11 may have a simplified profile, the centre line of which is carried by a plane approximating the region of the cone Cc in which the axis C is likely to be situated.

In the embodiment illustrated, the profile of the slide 11 follows a cone Cr which starting from the position Cd of the axis C when the mechanism is in the reference position, follows the cone Cc over a certain distance and then slightly differs by moving away from the axis D with respect to the cone Cc. Thus guidance of the point M is not affected in the positions close to the position Md corresponding to the reference position of the mechanism. On the other hand, in the positions Ma, Mf remote from the position Md, the slide following the centreline Cr tends to correct the error introduced by guidance of the axis C along a cone having a strictly circular base. Surprisingly, as shown by the positions Ma and Mf, the correction is favourable at both ends of the trajectory TU.

The mechanism shown in FIG. 8 is such that two positions of the point M and two positions of the axis B correspond to each position of the axis C (except for the reference position Cd). Thus the device shown in FIG. 8 can exactly correct only one of the ends of the trajectory TU or effect only one correction constituting a compromise for the two ends. The reason for this is that a position of the axis C exactly correcting a corresponding position of the point M at one end of the trajectory TU generally does not exactly correct the other position of the point M which corresponds to the same position of the axis C and which is close to the other end of the trajectory TU.

On the other hand, only one position of the driven point M on the trajectory TU corresponds to each useful position of the axis B. Thus another embodiment of the invention comprises correcting means which move at least one axis of the mechanism as a function of the position of the axis B in the direction of extension of the useful trajectory of the driven point M. It is thus possible independently to correct one or other of the two ends of the trajectory TU.

In the example illustrated in FIG. 9, the axis D of the crank 4 instead of being carried by the carrier member 1 is carried by the end of a lever 15 of which an axis S passing through the centre O is articulated to the carrier member 1. At its end associated with the axis D the lever 15 carries a stud 13 engaging in a slide 14 integral with the crank 3. The slide 14 is so profiled that in each useful angular position of the crank 3 the lever 15 is given an inclination which gives the axis D a suitable position for the trajectory TU of the driven point M to be maintained unchanged near the reference position, but being improved at its two ends.

In the example shown in FIG. 10, the axis D connects the crank 4 directly to the carrier member 1.

On the other hand, the axis A articulates the crank 3 to a link 16 of which a second axis T is articulated to the carrier member 1 in a position such that the plane AT is perpendicular to the plane AB in the reference position. Also, beyond the axis A the crank 3 bears a stud 17 engaging in a slide 18 rigidly borne by the carrier member 1. A given position of the stud 17 in the slide 18 corresponds to each angular position of the crank 3 thanks to the combined action of the link 16 and of the profile of the slide 18. The latter is so profiled that in respect of the trajectory of the driven point M it gives the same result as the embodiment shown in FIG. 9. Thus in this example the angular position of the crank 3 influences the position of its own articulation axis A.

In the example shown in FIG. 11, the crank 3 rigidly carries a constant-width cam 19 near the axis A which, as before, articulates the crank 3 to a link 16. The cam 19 is engaged in a profiled slide 21 rigidly carried by the carrier member 1.

An angular position of the cam 19 in the guide 21 corresponds to each angular position of the crank 3. The profile of the cam 19 is so devised as to provide an extension of the useful trajectory of the driven point M.

As shown in FIG. 12, in which the cam 19 is omitted for the sake of clarity, the embodiment of FIG. 11 may be modified by replacing the link 16 by a stud 22 carried by the crank 3 along the axis A and engaging in a slot 23 integral with the carrier member 1.

The example shown in FIG. 11 provides correction of the trajectory without any additional articulation and by introducing two slides (21 and 23) which can be short. The slot 23 can be made with a rectilinear profile parallel to the plane AB in the reference position of the mechanism. The trajectory of the axis A with respect to the carrier member 1 is then admittedly no longer exactly the same as that defined by the link 16 in FIG. 11, but the profile of the cam 19 can be modified as a result.

It will have been apparent from the description that the invention lends itself to a large number of applications in which slotted guide means can be replaced by at least semi-articulated guide means.

Of course the invention is not limited to the examples described and illustrated and numerous modifications can be made to these examples without departing from the scope of the invention.

Generally, the mathematical equations indicated enable the configurations with the best performances to be determined, but similar configurations which do not exactly satisfy the said equations provide results which although less good are usable in many cases, so that the invention is not limited to mechanisms which strictly satisfy the equations or constructions indicated.

When the angle U is 90°, the greatest possible precision is obtained in respect of the circularity of the trajectory TU. When U differs from 90°, the circularity is less good but the trajectory TU is extended, something which is useful in some embodiments.

When the axis C is guided by a slotted guide or slide, its profile may be so designed as to sharpen the curvature of the end of the trajectory TU. Such a result is advantageous when a movement along the trajectory TU is required to be terminated in a short bent movement with respect to the trajectory TU.

Moreover, each slide-and-stud guiding may be modified by providing a slide on the element having initially the stud, and a stud on the element having initially the slide.

I claim:

1. A mechanism for guiding a driven member (28) having a first driven axis (L) and a second driven axis (F), so that any point (M) of said first driven axis (L) follows a path (TU) substantially in the form of a segment of a circle having its center (O) at a finite distance on an intersection of said driven axes (L, F) with each other, whereas said second driven axis (F) is guided so as to angularly position said driven member (28) along said first driven axis (L), said mechanism including:
   a stationary carrier member (1);
   a movable member (2) articulated to said driven member (28) along said first driven axis (L);
   means connected to said movable member and defining first (B) and second (C) main axes which are carried by said movable member and intersect at said center (O);
   a crank (3) articulated to the movable member (2) along said first main axis (B) and to the carrier member (1) along an axis (A) extending through said center (O) so as to guide said first main axis (B) along a first conical path (Cb) having its apex at said center (O);
   means (3, 4) for guiding said second main axis (C) relative to the carrier member (1) along a second substantially conical path (Cc) having its apex at said center (O); and
   means (37, 41) for guiding a parallelism axis (E) attached to the crank (3) and passing through the center (O), along a third conical path (Ce) having as its axis said second driven axis (F);
wherein:
   on the one hand, the angle (h) between the two main axes (B, C), and, on the other hand, the conical paths of the main axes, allow the mechanism to take a reference position in which a main plane (PP) containing said main axes also contains the axis (A) of said first conical path (Cb),
   in said reference position, said main plane (PP) is at an angle (U) substantially in the range between 60° and 120° to a plane which intersects orthogonally along said second main axis (C) the second conical path (Cc), in said reference position, a plane containing the parallelism axis (E) and the axis (F) of the third conical path (Ce) forms, with a plane containing the first main axis (B) and the parallelism axis (E), an angle substantially equal to the angle (U) between the main plane (PP) and the plane orthogonally intersecting along the second main axis (C) the second conical path (Cc), the parallelism axis (E) is substantially in a plane containing the first main axis (B) and the axis (A) of the first conical path (Cb); and the mechanism substantially satisfies the following equations:

$$\sin 2x = 2\frac{\sin h \cdot \sin(h + r)}{\sin r}$$

$$\sin 2y = \frac{2\sin(y - r)}{\sin(x - h)} \sin(x + y - h - r)$$

$$V \simeq 0$$

where:

x denotes the angle between said second main axis (C) and said driven axis (L);

r denotes the angle at the apex of the first conical path (Cb);

h denotes the angle between the two main axes;

y denotes the angle between the parallelism axis (E) and the axis (A) of the first conical path (Cb);

V denotes the angle between the main plane (PP) and a plane containing the second main axis (C) and the first driven axis (L)

2. A mechanism according to claim 1, wherein in the reference position the main plane (PP) forms a same angle (W) with a plane containing the driven point (M) and the axis (F) of the third conical path (Ce) and with a plane containing on the one hand the axis (A) of the first conical path (Cb) and on the other hand an axis (D) of the second conical path (Cc).

3. A mechanism according to claim 1, for use as a window operator for a motor vehicle or the like, wherein the driven member is a window (28) curved substantially cylindrically, and wherein said center (O) lies substantially on an axis (XX, YY) of a segment of a circle substantially containing a path required for the driven point (M), and wherein in the reference position said main plane is substantially perpendicular to a plane in which said segment of a circle lies.

* * * * *